United States Patent [19]

Ohniwa et al.

[11] 4,355,878
[45] Oct. 26, 1982

[54] MAGNETIC DEVICE

[75] Inventors: Takehiko Ohniwa, Chichibu; Michio Senuma, Tokyo; Fumio Shimada, Kawasaki; Syuichiro Saito, Kawasaki; Yoshihiro Shigeta, Tokyo; Hiroshi Aizawa, Kawasaki, all of Japan

[73] Assignees: Canon Kabushiki Kaisha, Tokyo; Canon Denshi Kabushiki Kaisha, Saitama, both of Japan

[21] Appl. No.: 279,256

[22] Filed: Jul. 1, 1981

[30] Foreign Application Priority Data

Jul. 7, 1980 [JP] Japan .................... 55-95774[U]

[51] Int. Cl.³ .................... G03B 9/08; H01F 7/14
[52] U.S. Cl. .................... 354/234; 335/273; 335/274
[58] Field of Search .......... 354/234, 235; 335/298, 335/274, 273

[56] References Cited

U.S. PATENT DOCUMENTS 3,947,857  3/1976  Kiyoshi et al. .................. 354/234
4,284,968  8/1981  Denoyelle et al. ............. 335/42 X

FOREIGN PATENT DOCUMENTS 1220726  7/1966  Fed. Rep. of Germany ...... 354/234

Primary Examiner—John Gonzales
Attorney, Agent, or Firm—Toren, McGeady & Stanger

[57] ABSTRACT

A hold releasing magnetic device so designed that by controlling the current supply to a magnet the armature is displaced relative to the yoke so as to release a held shutter member wherein the armature and the yoke are supported coaxially with each other on the same shaft on a base plate on which the magnetic device is mounted, with the yoke being securable on the base plate.

1 Claim, 2 Drawing Figures

MAGNETIC DEVICE

BACKGROUND OF THE INVENTION

The present invention relates to a hold releasing magnetic device for releasing a held shutter member by means of a magnet, particularly including a mechanism for adjusting the gap in the magnetic circuit.

In the case of, for example, a conventional focal plane shutter for a camera, wherein a holding claw for locking the leading or the trailing shutter member charged with a spring is provided, various magnetic devices for releasing the holding claw have been proposed.

For example, one of the magnetic devices is so designed that a current is supplied to the magnetic device so as to hold the holding claw and the claw is released by interrupting the current supply to the magnet.

However, in the case of such a magnetic device, it often occurs that dust accumulates between the attracting surfaces of the yoke and the armature or that the attracting surfaces are worn thereby significantly decreasing the attracting force with the result that misoperation of the shutter takes place.

Further, in order to provide time for the current supply to the magnet it is necessary to provide a mechanism for maintaining the attracted state of the armature with the yoke and for releasing the attracted state along with shutter release.

Consequently such a magnetic device is not suited for simplification of the overall shutter mechanism and further lacks durability as well as reliability.

On the other hand, there has been proposed a device which operates to release the claw holding the shutter curtain when current is supplied to the magnet.

The maximum value of the current necessary for releasing the claw can be made very small by designing the above-mentioned hold releasing magnetic device in such a manner that the hold claw is struck at the position at which the attracted armature has obtained a certain determined speed while a certain determined gap has been provided in advance between the attracting surfaces of the yoke and the armature.

In the case of a magnetic device constructed as mentioned above, it is very important that the gap between the attracting surfaces of the armature and the yoke should be set correctly, and the relation between the position at which the armature starts to run and the position at which the hold claw is struck should be set correctly. Further, it is very important to increase the efficiency of the magnetic circuit so as to obtain a sufficient attracting power as well as to maintain the positions as long as possible once the armature, the yoke, the hold claw release member and the like have been set at the appropriate positions.

SUMMARY OF THE INVENTION

It is an object of the present invention to obtain a magnetic device of the type described so designed that a stabilized and large driving force can be obtained with a small current.

It is another object of the present invention to obtain an attracting type magnetic device so designed that the gap between the attracting surface of the armature and that of the yoke can be adjusted in a simple and appropriate way.

In accordance with an embodiment of the present invention the yoke of the magnetic device can be rotated around a certain determined shaft and secured on a mount base plate in a state in which the yoke has been rotated by a certain determined amount. Consequently at the time of adjusting the gap between the yoke and the armature the gap can be adjusted without displacing the armature, for example, without disturbing the positional relation between the armature and the shutter hold claw.

Further, in accordance with the present invention the rotation shaft of the armature is used in common as that of the yoke so that even when the yoke is rotated the relation between the attracting surface of the armature and that of the yoke remains unchanged.

Further, the armature consists of a material with comparatively high magnetic permeability so that the efficiency of the magnetic circuit is increased.

Further, in accordance with present invention there is provided between the armature and the yoke an elastic member applying a spring force in a direction along which the armature is separated from the yoke so that the adjustment can be carried out easily even when the yoke is rotated.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENTS

Figure 1:
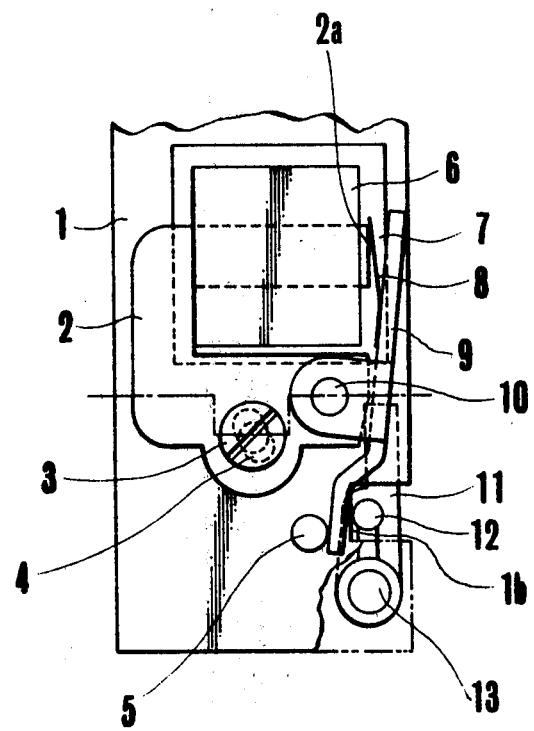
FIG. 1 shows the hold releasing magnetic device of the present invention in plan view.
Figure 2:
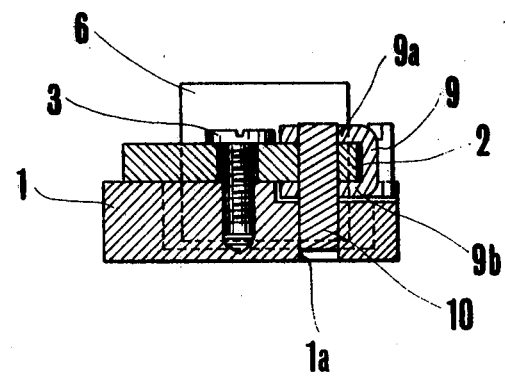
FIG. 2 shows the magnetic device shown in FIG. 1 in section.

In FIG. 1 there is shown a magnetic device for releasing a shutter curtain in accordance with the present invention and FIG. 2 shows a section of the device shown in FIG. 1 through an armature shaft 10 and a securing screw 3.

1 is a mount base plate on which the magnetic device is mounted, 2 is a yoke constituting part of the magnetic device, 3 is the securing screw and 4 is an elongated hole in which the securing screw 3 is inserted, whereby the yoke 2 can be secured in the threaded groove in the base plate 1 by means of the securing screw 3. Further, the elongated hole 4 is provided along the circumferential direction of a circle having as the center thereof the shaft 10. 6 is a coil wound around a part of the above-mentioned yoke 2 and the shaft 10 rotatably supports the yoke 2 on the base plate 1.

9 is the armature to be attracted with the yoke 2, and the yoke 2 is sandwiched between bent portions 9a and 9b, while the armature 9 is rotatably supported with the shaft 10.

In the embodiment disclosed, the shaft 10 rotatably connecting the armature 9 to the yoke 2 is inserted into a hole 1a as shown in FIG. 2 provided in the mount base plate 1. Further, 8 is a plate spring consisting of an amagnetic material, having a smaller elasticity or spring force than the attractive force of the magnet. 5 is a stopper pin provided on the base plate 1 in such a manner that when no current is supplied to the coil 6 the armature 9 is rotated around the shaft 10 along the clockwise direction until one end of the armature is brought into contact with the pin 5. The initial position of the armature is determined in this way. 11 is a holding claw of the shutter curtain for locking the shutter curtain, the claw 11 being charged by means of a spring not shown in the drawing. Further, the claw 11 is rotatably borne be a shaft 13, with a hold releasing pin 12 being provided. The claw 11 is urged along the counterclockwise direction in the drawing by means of a spring not shown in the drawing, whereby the shutter curtain is held at the position at which the pin 12 is in contact with the notch 1b in the base plate 1.

In the state shown in FIG. 1, no current is supplied to the coil 6, and the armature 9 has been rotated along the clockwise direction by means of the spring 8 until it is in contact with the stopper 5, thereby assuming the initial state.

When a current is supplied to the coil 6 the yoke 2 attracts the armature 9 against the strength of the spring 8, whereby the armature 9 is accelerated and strikes against the release pin 12 with one end thereof moving along the direction to the right in the drawing. By means of this hammer effect the shutter is easily released so as to allow the shutter curtain to start to run.

Consequently, the amount of current to be supplied to the coil 6 can be significantly decreased.

In order to assemble the magnet device shown in FIG. 1 as mentioned above, it is important to set the distance between the attracting surface 2a of the yoke 2 and the armature 9 correctly.

In the case of the present embodiment, the yoke 2 is rotatable around the shaft 10 so that if the screw 3 is loosened the yoke 2 is displaced around the shaft 10 along the counterclockwise direction in the drawing and therefore, the distance can be adjusted in a very easy way. Further, because at this time the armature 9 is kept in the above-mentioned initial state by means of the shaft 10, the spring 8 and the stopper 5, the positional relation between the armature 9, the stopper 5 and the release pin 12 remains unchanged, so that the gap can be easily adjusted merely by displacing the yoke. Further, when the yoke 2 is secured on the base plate 1 by means of the securing screw 3 after the distance between the armature 9 and the attracting surface 2a of the yoke 2 has been adjusted, the yoke is firmly secured at two points by means of the screw 3 and the shaft 10 so as to be resistant against shock, thereby adding significantly to the reliability of the device.

Further, by supporting the yoke 2 coaxially with the armature 9 on the shaft 10 mounted in the mount base plate 1 the attracting surface 2a of the yoke can always be brought into correct alignment with that of the armature 9.

Because the armature is set at the initial position while only the yoke is moved, the gap in the magnetic circuit can be finely adjusted without disturbing the set state of the initial position of the armature, the hold claw releasing position and so on. Further, the yoke 2 is connected to the armature so that the magnetic efficiency of the magnetic circuit is high, which is quite advantageous. While a specific embodiment of the invention has been shown and described in detail to illustrate the application of the inventive principles, it will be understood that the invention may be embodied otherwise without departing from such principles.

What is claimed is:

1. A magnetic device for a camera including a shutter hold claw for holding a shutter screen at a certain predetermined position comprising
   (a) a conductive member, said member being supplied with a current so as to form magnetic flux along a certain determined direction;
   (b) a yoke consisting of a material with high magnetic permeability so as to direct the magnetic flux formed with said conductive member;
   (c) a base plate with a rotation shaft, said yoke being supported rotatably on said base plate by said rotation shaft;
   (d) an elastic member;
   (e) a stopper on said base plate;
   (f) an armature rotatably supported by said rotation shaft commonly with said yoke and having a pair of arms oppositely extending from said shaft, one arm being drawn by a part of said yoke, the other arm being positioned so as to strike said shutter hold claw and being normally biased to a certain distance from said shutter hold claw by said elastic member to contact said stopper on said base plate; and
   (g) a yoke securing member capable of securing said yoke at a different position from that of the rotation shaft on said base plate after the yoke has been rotated around the rotation shaft by a certain determined amount.

* * * * *